2,751,307

METHOD FOR PRODUCING TITANIUM CONCENTRATES

David L. Armant, Metuchen, N. J., and Harold S. Sigurdson, Indianapolis, Ind., assignors to National Lead Company, New York, N. Y., a corporation of New Jersey No Drawing. Application July 23, 1954,
Serial No. 445,464

4 Claims. (Cl. 106—51)

This invention relates to titaniferous compositions of matter which react readily with strong mineral acids, particularly sulphuric acid, and to methods for preparing the same.

Industrial processes for the preparation of titanium dioxide pigments depend, in the first instance, upon a reaction between an iron-containing titaniferous material, ilmenite ore, and strong sulphuric acid. By means of this reaction which, in the trade, is generally termed "digestion" or "attack" the titanium and iron values, among others, are solubilized. The iron values play no important role in the process and are almost invariably removed after dissolution, as by crystallization. However, in the digestion reaction, they consume valuable acid which adds to the cost of producing the finished pigment.

Consequently, interest has developed in titaniferous compositions such as slags which contain a higher proportion of titanium than is usually present in ilmenite and relatively lower proportions of constituents like iron which consume valuable acid. Such slags are produced by smelting titaniferous ores in the presence of various fluxing agents. In producing such slags it has been found that the presence of appreciable quantities of alumina and silica normally produce viscous masses which are difficult to remove from the furnace unless the fluxing agents are employed in amounts greater than normal in order to satisfy the demand of the alumina and silica constituents. When such greater amounts of fluxing agents are employed the slags produced are lower in $TiO_2$ concentration than those produced from ores containing small amounts of alumina and silica constituents. From such viscous masses it is difficult to separate the molten iron metal from the slag formed. It has further been found that titanium materials containing appreciable quantities of alumina and silica are difficult and sometimes impossible to digest in strong sulphuric acid due to the formation of bulky aluminum and silicon compounds which prevent the reaction of sulphuric acid and the titanium values to normally take place. The present invention provides methods for the preparation of novel titaniferous compositions which because of ready digestibility in strong sulphuric acid and relatively high titanium content are especially suited for the economical preparation of titanium dioxide pigments.

The principal object of the present invention is, therefore, the preparation of compositions or concentrates rich in titanium, relatively poor in iron and readily digestible in strong sulfuric acid from raw materials containing alumina and silica. Another object of the present invention is the preparation of slag compositions which when molten are not viscous and flow freely.

A still further object is to produce readily digestible titanium concentrates which do not contain excessive quantities of fluxing agents. These and other objects of the invention will be apparent from the following more complete description:

The compositions of the present invention are characterized broadly first as being readily digestible in strong sulphuric acid, the term "readily digestible" being hereinafter defined, second, as having a small content of unreduced iron (iron oxide, FeO) but appreciably less total iron than contained in the original titaniferous iron starting material.

For the purposes of the present invention, the term "readily digestible" indicates a composition which, when subjected to a test, the conditions of which are about to be described, gives a yield of solubilized titanium, calculated as $TiO_2$, of at least 80% of the total titanium content ($TiO_2$ basis) of the composition.

TEST FOR DIGESTIBILITY

Ten grams of comminuted titaniferous material of fineness such as to pass through a 325 mesh screen are heated in an oven to 100° C. Sulphuric acid of at least 85% strength, in an amount sufficient theoretically to combine with the base-forming elements, e. g. FeO, MgO and CaO in the material and, in addition, to provide a ratio of $H_2SO_4$ to $TiO_2$ of 2.0 (assumed 96% solubilization of all reactable constituents) is weighed into a large test tube, for instance, a 150 x 25 mm. size. The acid is heated in the test tube, preferably by means of a sand bath, up to 150° C. to 170° C. The hot comminuted titaniferous material is then quickly poured into the heated acid and the whole is thoroughly mixed. Reaction starts promptly and the temperature rises rapidly 30°–50° C., and then slowly falls. When the digestion mass in the test tube begins to thicken, the test tube is placed in an oven at 170°–190° C. and left there for 2 hours in order to "dry out" or "cure" the digestion cake. The cured cake is then dissolved in water or weak sulphuric acid. The content of dissolved $TiO_2$ is determined by conventional analytic procedures.

The titaniferous compositions described in the appended claims as "digestible in strong sulphuric acid" when subject to the foregoing test will show yields of solubilized $TiO_2$ of at least 80%. Preferred compositions will give yields of 90% and higher.

Compositions having the foregoing characteristics are obtained by the process of the instant invention which comprises admixing a titaniferous iron ore containing alumina and silica with an oxidic compound of calcium and an oxidic compound of sodium and/or potassium as a flux and a carbonaceous reducing agent. The mixture is heated to form molten iron metal and a titanium slag, the molten iron and titanium slag are separated from one another and the slag portion acid leached with dilute sulphuric acid to produce a digestible titanium concentrate. It has been found that the FeO in the slag before acid leaching should be present in amount from 1%–5% and the amount of $Na_2O$ and/or $K_2O$ from 1%–5%. The amount of oxidic compounds of calcium and sodium and/or potassium added as fluxing agents should be sufficient to produce in the slag amounts which fall within the following ratios by weight $$\frac{CaO+(Na_2O+K_2O)}{Al_2O_3+SiO_2+TiO_2}=.16 \text{ to } .30$$

when the $TiO_2$ content in the titaniferous iron ore is between 8% and 20% and .11 to .30 when the $TiO_2$ content in the titaniferous iron ore is above 20% and up to 60%.

The titanium starting material used in the process of this invention preferably is a titaniferous iron ore. Titaniferous iron ores of various types have been employed. The titanium content of such ores varies widely. Ores containing as low as 8% $TiO_2$ and as high as 60% $TiO_2$ have been employed with equal success. Ores containing small amounts of $TiO_2$ which are particularly adaptable are those of the magnetite types, while ores containing higher amounts of $TiO_2$ are those of the ilmenite type.

Substantially all titaniferous iron ores contain various amounts of silica and alumina. These two particular constituents in the ores are normally difficult to process in slagging operations because of the viscous type melts which are formed upon high temperature treatment. Such viscous melts normally prevent clear separation of the slag from the molten metal and normally are difficult to remove from the furnace. It has been found by the instant invention, however, that small amounts of oxidic compounds of calcium and sodium and/or potassium added as fluxing agents fix the silica and alumina values in a form which permits a free flowing and fluid slag to be obtained during the heating step. Furthermore the calcium and sodium or potassium additions render the silica and alumina values soluble in dilute sulphuric acid and therefore they are readily removed during a subsequent leaching operation. By the term "oxidic" compounds of calcium and sodium or potassium, it is meant to include oxides, carbonates, hydroxides and other compounds which form oxides upon heating. Both the sodium and potassium compounds may be obtained economically as products or by-products from the chemical industry or from natural occurring minerals, such as for example, trona or niter, or may be produced from such raw materials as halite, sylvite or feldspars.

It has been found that if the amounts of calcium and sodium or potassium constituents are added within certain specified limits, the titanium values will remain in an insoluble form during the dilute acid leaching operation while a large portion of the silica and alumina constituents will be solubilized. This provides for a titanium concentrate to be produced which is low in both silica and alumina.

It has been found that the process should be carried out at temperatures between about 1300° C. and 1700° C. to obtain substantially complete reduction of the iron values. It is preferable however to carry out the smelting step at temperatures from 1300° C. to 1500° C. Higher temperatures can be employed but careful operation is necessary to avoid excessive reduction of the iron values and even the titanium values. By smelting within the temperature range and using the fluxing agents previously described a fluid, free-flowing slag is produced and both the silica and alumina constituents in the ore are fixed in the slag in a form in which they will be readily solubilized during a subsequent acid leaching operation.

In carrying out the process of the instant invention, the titaniferous iron ore is admixed with the proper amount of fluxing agents and with a carbonaceous reducing agent, such as e. g. powdered carbon, coke or coal. The amount of carbonaceous reducing agent to be employed should be sufficient to reduce substantially all of the iron oxide values to metallic iron. The mixture is then heated to a temperature between 1300° C.–1700° C. until the iron content remaining in the slag portion is between 1%–5% FeO. The amount of Na₂O and/or K₂O present in the slag should be between 1%–5%. The amount of Na₂O or K₂O plus CaO added will vary depending upon the amount of TiO₂ plus SiO₂ plus Al₂O₃ present in the titaniferous starting material. When the titanium dioxide content in the titaniferous iron ore is between 8% and 20%, the ratio of $$\frac{CaO + (Na_2O + K_2O)}{Al_2O_3 + SiO_2 + TiO_2}$$

should be between .16 and .30. When the titanium dioxide content in the titaniferous iron ore is above 20% and up to 60%, the ratio $$\frac{CaO + (Na_2O + K_2O)}{Al_2O_3 + SiO_2 + TiO_2}$$

should be between .11 and .30.

The slag and molten iron metal formed as separate layers in the furnace are then separated from one another. The slag is then leached in dilute sulphuric acid to solubilize the sodium or potassium, aluminum and silicon acid soluble values but not the titanium values and the leached slag is separated from the leach liquor. The acid leached slag formed by the process of this invention is readily digestible in strong sulphuric acid by the method previously described.

In slagging operations it is difficult to maintain all of the sodium values in the mixture as the slagging operation proceeds. Usually a portion of the sodium content and in fact some of the potassium added as a fluxing agent is volatilized during the heating operation and therefore a portion is lost from the system. The amount of sodium and potassium content lost during the operation may vary widely with the individual furnace used. It is therefore necessary to take this loss factor into account when determining the amount of fluxing agents to be employed in the instant smelting operation. By minimum experimentation it is simple to determine the amount of sodium and potassium loss on the particular furnace to be employed and such loss is then compensated for in subsequent smelting runs.

In carrying out the acid leaching operation of the slag produced by the instant invention it has been found that satisfactory results have been obtained when dilute sulphuric acid is employed. The strength of sulphuric acid used preferably should be from 5% to 15%. The amount of sulphuric acid employed in the leaching operation should be in slight excess over the amount required to react with all of the sodium or potassium, aluminum, silicon and iron constituents. It is preferred to carry out the leaching operation at temperatures from 25° C. to 80° C. By carrying out the leaching operation within the preferred limits previously given it has been found that efficient leaching of the aluminum and silicon constituents will be obtained with a minimum loss of titanium values.

In order to more fully illustrate the instant invention the following examples are presented to show typical operations employing various types of titaniferous iron ores using various amounts of fluxing agents.

*Example I*

100 parts of ground titaniferous iron ore were dry blended with 3.8 parts of limestone (2.0 parts CaO), 1.7 parts of soda ash (1.0 part Na₂O) and 15 parts of coke. The ore had the following analysis:

| | Percent |
|---|---|
| TiO₂ | 21.8 |
| FeO | 34.4 |
| Fe₂O₃ | 33.6 |
| CaO | 0.6 |
| SiO₂ | 3.0 |
| Al₂O₃ | 4.8 |
| MgO | 1.8 |

The above mixture was charged into an arc furnace heated to 1400° C. and held at that temperature for one hour. The molten iron and the slag were separately tapped from the furnace. The slag produced was fluid and free-flowing.

The cooled slag was ground to substantially all minus 325 mesh (5%+325) and analyzed. The slag had the following analysis:

| | Percent |
|---|---|
| TiO₂ | 62.7 |
| FeO | 2.7 |
| Na₂O | 1.4 |
| CaO | 7.9 |
| SiO₂ | 9.5 |
| Al₂O₃ | 11.6 |
| MgO | 4.2 |

It should be noted that the FeO content in the slag was 2.7%, the Na₂O content 1.4%, and the ratio $$\frac{CaO+Na_2O}{TiO_2+Al_2O_3+SiO_2}=0.11$$

The ground slag was then leached in 10% sulphuric acid for one hour at 75° C. with rapid stirring and the leach liquor was removed from the leached slag by filtration. The leached slag had the following analysis:

| | Percent |
|---|---|
| $TiO_2$ | 76.2 |
| FeO | 2.9 |
| $Na_2O$ | 0.4 |
| CaO | 8.5 |
| $SiO_2$ | 1.1 |
| $Al_2O_3$ | 6.8 |
| MgO | 4.1 |

The leached slag was then digested in 89% sulphuric acid according to the digestion procedure given above and a $TiO_2$ recovery of 97% of the titanium values in the slag was digested and recovered as soluble titanium.

The analysis of the slags before and after acid leaching, and the digestion recovery are recorded in the table.

Example II

Another slag was prepared using titaniferous magnetite having the following analysis:

| | Percent |
|---|---|
| $TiO_2$ | 9.5 |
| FeO | 32.2 |
| $Fe_2O_3$ | 48.6 |
| CaO | 0.6 |
| $SiO_2$ | 2.3 |
| $Al_2O_3$ | 5.6 |
| MgO | 1.2 |

This ore was blended with 4.2 parts of limestone (2.2 parts CaO), 3.4 parts of soda ash (2.0 parts of $Na_2O$), and 17.5 parts of coke. The mixture was processed according to the procedure described in Example I and the results are recorded in the table.

Example III

Another slag was prepared using the titaniferous iron ore shown in Example I in which more lime was added as a fluxing agent. In this example the ore was blended with 11.0 parts of limestone (6.0 parts CaO) and 1.7 parts of soda ash (1.0 part $Na_2O$) and 18.3 parts coke. The mixture was processed according to the procedure described in Example I and the results are recorded in the table.

Example IV

Another slag was prepared using ilmenite having the following analysis:

| | Percent |
|---|---|
| $TiO_2$ | 43.7 |
| FeO | 36.8 |
| $Fe_2O_3$ | 7.1 |
| CaO | 2.2 |
| $SiO_2$ | 5.2 |
| $Al_2O_3$ | 2.6 |
| MgO | 2.4 |

This ore was blended with 7.6 parts of limestone (4.0 parts CaO) and 1.7 parts of soda ash (1.0 part $Na_2O$) and 11.0 parts coke. The ore was processed according to the procedure described in Example I and the results are recorded in the table.

Example V

Another slag was prepared using another ilmenite which had the following analysis:

| | Percent |
|---|---|
| $TiO_2$ | 40.2 |
| FeO | 28.5 |
| $Fe_2O_3$ | 19.1 |
| CaO | 1.2 |
| $SiO_2$ | 3.7 |
| $Al_2O_3$ | 3.2 |
| MgO | 4.1 |

This ore was blended with 11.8 parts of limestone (6.2 parts CaO), 1.7 parts of soda ash (1.0 part $Na_2O$), and 15.0 parts coke. The mixture was processed according to the procedure described above and the results are recorded in the table.

Example VI

The procedure used in Example II was repeated except 1.0 part of $K_2O$ (added as $K_2CO_3$) and 1.0 part of $Na_2O$ was used in place of 2.0 parts of $Na_2O$. The results are recorded in the table.

Example VII

Using the same ore as that described in Example II, Example II was repeated except that 2.0 parts of $K_2O$ were used in place of $Na_2O$. The results are recorded in the table.

Example VIII

Using the procedure described in Example III with the ore described in Example I, 1.0 part of $K_2O$ was used in place of 1.0 part of $Na_2O$. The results are recorded in the table below.

TABLE

| | Examples | | | | | | | |
|---|---|---|---|---|---|---|---|---|
| | I | II | III | IV | V | VI | VII | VIII |
| Slag: | | | | | | | | |
| Percent $TiO_2$ | 62.7 | 43.3 | 55.6 | 64.0 | 62.4 | 40.6 | 40.0 | 54.8 |
| Percent FeO | 2.7 | 1.8 | 3.5 | 1.9 | 3.5 | 3.4 | 4.4 | 2.6 |
| Percent $Na_2O$ | 1.4 | 2.4 | 1.6 | 1.4 | 1.9 | 2.6 | 0.0 | 0.0 |
| Percent $K_2O$ | | | | | | 2.5 | 5.4 | 1.8 |
| Percent CaO | 7.9 | 13.3 | 18.0 | 9.2 | 13.0 | 12.0 | 11.8 | 16.6 |
| Percent $SiO_2$ | 9.5 | 11.6 | 8.9 | 10.0 | 6.5 | 9.9 | 9.7 | 7.6 |
| Percent $Al_2O_3$ | 11.6 | 21.3 | 7.4 | 6.3 | 7.2 | 23.9 | 23.6 | 12.1 |
| Percent MgO | 4.2 | 6.3 | 5.0 | 7.2 | 5.5 | 5.1 | 5.1 | 4.5 |
| $\frac{CaO+(Na_2O+K_2O)}{TiO_2+SiO_2+Al_2O_3}=$ | .11 | .21 | .27 | .13 | .19 | .23 | .24 | .25 |
| Leached slag: | | | | | | | | |
| Percent $TiO_2$ | 76.2 | 55.8 | 67.9 | 76.4 | 70.5 | 52.7 | 52.4 | 66.4 |
| Percent FeO | 2.9 | 1.4 | 2.3 | 1.2 | 2.1 | 2.3 | 2.8 | 1.6 |
| Percent $Na_2O$ | 0.4 | 0.3 | 0.3 | 1.1 | 1.5 | 0.3 | 0.0 | 0.0 |
| Percent $K_2O$ | | | | | | 0.4 | 0.7 | 0.3 |
| Percent CaO | 8.5 | 14.7 | 18.8 | 8.9 | 13.4 | 12.8 | 12.7 | 16.6 |
| Percent $SiO_2$ | 1.1 | 1.1 | 1.3 | 3.8 | 3.3 | 0.7 | 0.8 | 0.5 |
| Percent $Al_2O_3$ | 6.8 | 19.0 | 4.1 | 3.0 | 4.1 | 25.3 | 25.1 | 10.1 |
| Percent MgO | 4.1 | 7.7 | 5.3 | 5.6 | 5.1 | 5.5 | 5.5 | 4.5 |
| Digestion (89% $H_2SO_4$): Percent $TiO_2$ Solubilization | 97 | 94 | 95 | 97 | 92 | 94 | 93 | 96 |

It has clearly been shown by the description of the instant invention and by the examples presented that readily digestible titanium concentrates may be prepared from raw materials containing alumina and silica. Such concentrates are rich in titanium values and relatively poor in iron, alumina and silica. By the process of the instant invention the alumina and silica constituents which normally are difficult and sometimes substantially impossible to handle, are fixed in the slag, by the addition of oxidic compounds of calcium and sodium and/or potassium as fluxing agents, in forms which are easily removed by a subsequent acid leaching operation. The amount of oxidic compounds of calcium and sodium and/or potassium added as fluxing agents are carefully controlled within specified limits in order to selectively solubilize the aluminum and silicon constituents in a subsequent acid leaching step without solubilizing the titanium values. Slag prepared using oxidic compounds of sodium or potassium and calcium within the specified limits form free-flowing and non-viscous slags. Such free-flowing slags provide efficient and effective separations of the slag and molten iron portions. Such slags are easy to handle and economical to process. The titanium concentrate formed by the instant invention contains small amounts of residual iron, aluminum and silicon constituents thereby providing for a titanium concentrate high in $TiO_2$ content.

This application in a continuation-in-part of our application Serial No. 219,522, filed April 5, 1951, now abandoned.

While this invention has been described and illustrated by the examples shown, it is not intended to be strictly limited thereto and other modifications and variations may be employed within the scope of the following claims.

We claim:
1. A method for producing a digestible concentrate from titaniferous iron ore containing compounds of aluminum and silicon, wherein the $TiO_2$ content of said ore is from 8% to 60% by weight, which comprises admixing said ore with an oxidic compound of calcium and compound selected from the group consisting of oxidic compound of sodium and oxidic compound of potassium and mixtures thereof and a carbonaceous reducing agent, heating said mixture to form a slag and molten iron at a temperature between 1300° C. and 1700° C. until the FeO content of said slag is reduced to between 1% and 5%, the amount of oxidic compound of calcium and compound selected from the group consisting of oxidic compound of sodium and oxidic compound of potassium and mixtures thereof present in said mixture being sufficient to produce a slag which contains between 1% and 5% of a compound selected from the group consisting of oxidic compound of sodium and oxidic compound of potassium and mixtures thereof, calculated as oxide and in which the weight ratio:

$$\frac{CaO + (Na_2O + K_2O)}{Al_2O_3 + SiO_2 + TiO_2} = .16 \text{ to } .30$$

when the $TiO_2$ content in the titaniferous iron ore is between 8% and 20% and .11 to .30 when the $TiO_2$ content in the titaniferous iron ore is above 20% and up to 60%, leaching said slag with dilute sulphuric acid to remove the aluminum and silicon acid-soluble compounds and the compound selected from the group consisting of oxidic compound of sodium and oxidic compound of potassium and mixtures thereof and separating the leach liquor from the leached titanium slag.

2. Method according to claim 1 in which said mixture is heated at a temperature of 1300° C. to 1500° C.

3. Method according to claim 1 in which the slag is leached with sulphuric acid of strength between 5% and 15%.

4. Method according to claim 1 in which the slag is leached with said dilute sulfuric acid at temperature between 25° C and 80° C.

References Cited in the file of this patent
UNITED STATES PATENTS

| | | |
|---|---|---|
| 2,417,101 | Campbell | Mar. 11, 1947 |
| 2,476,453 | Pierce et al. | July 19, 1949 |
| 2,537,229 | McLaren | Jan. 9, 1951 |